United States Patent
Green et al.

(10) Patent No.: US 8,015,193 B2
(45) Date of Patent: Sep. 6, 2011

(54) METHOD AND SYSTEM FOR ACCESSING A FILE SYSTEM

(75) Inventors: Stephen J. Green, Burlington, MA (US); Jeffrey L. Alexander, Arlington, MA (US); Paul B. Lamere, Nashua, NH (US)

(73) Assignee: Oracle America, Inc., Redwood City, CA (US)

( * ) Notice: Subject to any disclaimer, the term of this patent is extended or adjusted under 35 U.S.C. 154(b) by 0 days.

(21) Appl. No.: 12/968,180

(22) Filed: Dec. 14, 2010

(65) Prior Publication Data

US 2011/0113042 A1 May 12, 2011

Related U.S. Application Data

(63) Continuation of application No. 11/780,135, filed on Jul. 19, 2007, now Pat. No. 7,877,393.

(51) Int. Cl.
*G07F 7/00* (2006.01)

(52) U.S. Cl. .......................................... 707/749; 707/750

(58) Field of Classification Search ................... 707/749, 707/750
See application file for complete search history.

(56) References Cited

U.S. PATENT DOCUMENTS

| | | | |
|---|---|---|---|
| 7,680,859 B2* | 3/2010 | Schiller .......................... | 707/738 |
| 7,774,335 B1* | 8/2010 | Scofield et al. ................ | 707/709 |
| 7,779,002 B1* | 8/2010 | Gomes et al. .................. | 707/728 |
| 2003/0061201 A1* | 3/2003 | Grefenstette et al. ............. | 707/3 |
| 2003/0126136 A1* | 7/2003 | Omoigui .......................... | 707/10 |
| 2003/0182282 A1* | 9/2003 | Ripley ............................. | 707/5 |
| 2005/0060643 A1* | 3/2005 | Glass et al. .................... | 715/501.1 |
| 2005/0086205 A1* | 4/2005 | Franciosa et al. ................ | 707/3 |
| 2005/0289168 A1* | 12/2005 | Green et al. .................. | 707/101 |
| 2006/0031077 A1* | 2/2006 | Dalton et al. ...................... | 705/1 |
| 2010/0094879 A1* | 4/2010 | Donnelly et al. ............. | 707/749 |
| 2010/0174605 A1* | 7/2010 | Dean et al. .................. | 705/14.49 |
| 2010/0198839 A1* | 8/2010 | Basu et al. ..................... | 707/749 |
| 2010/0198840 A1* | 8/2010 | Basu et al. ..................... | 707/749 |
| 2010/0198841 A1* | 8/2010 | Parker et al. .................. | 707/750 |

\* cited by examiner

*Primary Examiner* — Mohammad Ali
*Assistant Examiner* — John P Hocker
(74) *Attorney, Agent, or Firm* — Osha • Liang LLP

(57) ABSTRACT

A method for accessing a file system including computing a first numerical similarity score for a first stored document and a second numerical similarity score for a second stored document by comparing a plurality of weighted active terms with a plurality of weighted indexed terms, determining a document order of the first stored document followed by the second stored document based on the first numerical similarity score exceeding the second numerical similarity score, generating a list of similar documents including the first stored document followed by the second stored document based on the document order, and displaying, in a file system interface and on the computer display, the list of similar documents while an active document is open in an active document interface.

17 Claims, 7 Drawing Sheets

METHOD AND SYSTEM FOR ACCESSING A FILE SYSTEM

CROSS-REFERENCE TO RELATED APPLICATIONS

This application is a continuation of U.S. patent application Ser. No. 11/780,135, entitled: "METHOD AND SYSTEM FOR ACCESSING A FILE SYSTEM" and filed on Jul. 19, 2007. Accordingly, this application claims benefit from U.S. patent application Ser. No. 11/780,135 under 35 U.S.C. §120.

BACKGROUND

Computers pervade virtually every aspect of an individual's life. One aspect that has been significantly impacted is the ability to store and retrieve information. Classically, in order to store and retrieve information, a user would use a filing cabinet with drawers filled with folders. Inside the folders are the files that a user stores. To store a file, the user identifies the appropriate drawer. Next, the user would identify the correct folder before physically placing the file into the drawer. In order to retrieve a file, the user opens the appropriate drawer, then the appropriate folder, and finally pulls the file out of the folder. The classical technique relies upon the organizational skills of the user. Specifically, the user typically has an organizational system for filing files (e.g., alphabetically, by category, etc.).

In keeping with the filing cabinet metaphor, computers also allow for storing and maintaining files. Specifically, computers maintain the hierarchy of drawers, folders, and files with directories, sub-directories, and files. However, whereas the hierarchy is typically three layers deep for a filing cabinet, the hierarchy maintained on a computer may be virtually infinitely deep. Specifically, a directory on a user's computer often has one or more sub-directories.

For example, a computer may have a directory for each user. Inside the user directory are directories corresponding to the classifications of projects upon which the user is working. Inside the project classifications directory are sub-directories for each project. Inside the project directories are sub-directories corresponding to the subparts of a project, etc. Thus, the computers rely on the individual's organizational skills more than the physical filing cabinet.

In order to alleviate the requirement on a user to have organizational skills, several techniques are employed by developers of interfaces to the access and maintain user's files. For example, many operating systems have a directory that is specifically reserved for the user's files and separate from the system files. By separating the system files from the user's files, the user has the option of viewing only the files pertinent to the user. In another example, applications will often automatically create a directory reserved for the user's files that are associated with that application. When the user requests to open a file within the application, the directory created by the application for the user is opened. Thus, interfaces to directories may assist the user to access files.

SUMMARY

In general, in one aspect, the invention relates to a method for accessing a file system comprising identifying a plurality of active terms comprising words found in an active document, determining a plurality of active frequencies of occurrence of the plurality of active terms, assigning a plurality of active weights to the plurality of active terms based on the plurality of active frequencies of occurrence to generate a plurality of weighted active terms, identifying a plurality of weighted indexed terms comprising words found in a plurality of stored documents that are stored in the file system, wherein the plurality of weighted indexed terms are weighted according to a plurality of stored frequencies of occurrence in the plurality of stored documents, computing a first numerical similarity score for a first stored document and a second numerical similarity score for a second stored document by comparing the plurality of weighted active terms with the plurality of weighted indexed terms, determining a document order of the first stored document followed by the second stored document based on the first numerical similarity score exceeding the second numerical similarity score, generating a list of similar documents comprising the first stored document followed by the second stored document based on the document order, and displaying, in a file system interface and on a computer display, the list of similar documents while an active document is open in an active document interface.

In general, in one aspect, the invention relates to a system for accessing a file system comprising a memory coupled to a processor; a document index, stored in the memory and configured to store a plurality of active terms comprising words found in an active document; a search index stored in the memory and configured to store a plurality of weighted indexed terms comprising words found in a plurality of stored documents that are stored in the file system, wherein the plurality of weighted indexed terms are weighted according to a plurality of stored frequencies of occurrence in the plurality of stored documents; a file system engine, executing on the processor and configured to determine a plurality of active frequencies of occurrence of the plurality of active terms, assign a plurality of active weights to the plurality of active terms based on the plurality of active frequencies of occurrence to generate a plurality of weighted active terms, compute a first numerical similarity score for a first stored document and a second numerical similarity score for a second stored document by comparing the plurality of weighted active terms with the plurality of weighted indexed terms, determine a document order of the first stored document followed by the second stored document based on the first numerical similarity score exceeding the second numerical similarity score, and generate the list of similar documents comprising the first stored document followed by the second stored document based on the document order; and a file system interface, executing on the processor and configured to display a list of similar documents while the active document is open in the active document interface.

In general, in one aspect, the invention relates to a non-transitory computer readable medium storing instruction for accessing a file system, the instructions executable on a processor and comprising functionality for identifying a plurality of active terms comprising words found in an active document, determining a plurality of active frequencies of occurrence of the plurality of active terms, assigning a plurality of active weights to the plurality of active terms based on the plurality of active frequencies of occurrence to generate a plurality of weighted active terms, identifying a plurality of weighted indexed terms comprising words found in a plurality of stored documents that are stored in the file system, wherein the plurality of weighted indexed terms are weighted according to a plurality of stored frequencies of occurrence in the plurality of stored documents, computing a first numerical similarity score for a first stored document and a second numerical similarity score for a second stored document by comparing the plurality of weighted active terms with the plurality of weighted indexed terms, determining a document order of the first stored document followed by the second stored document based on the first numerical similarity score exceeding the second numerical similarity score, generating a list of similar documents comprising the first stored document followed by the second stored document based on the document order, and displaying, in the file system interface and on the computer display, the list of similar documents while the active document is open in the active document interface.

Other aspects of the invention will be apparent from the following description and the appended claims.

DETAILED DESCRIPTION

Figure 1:
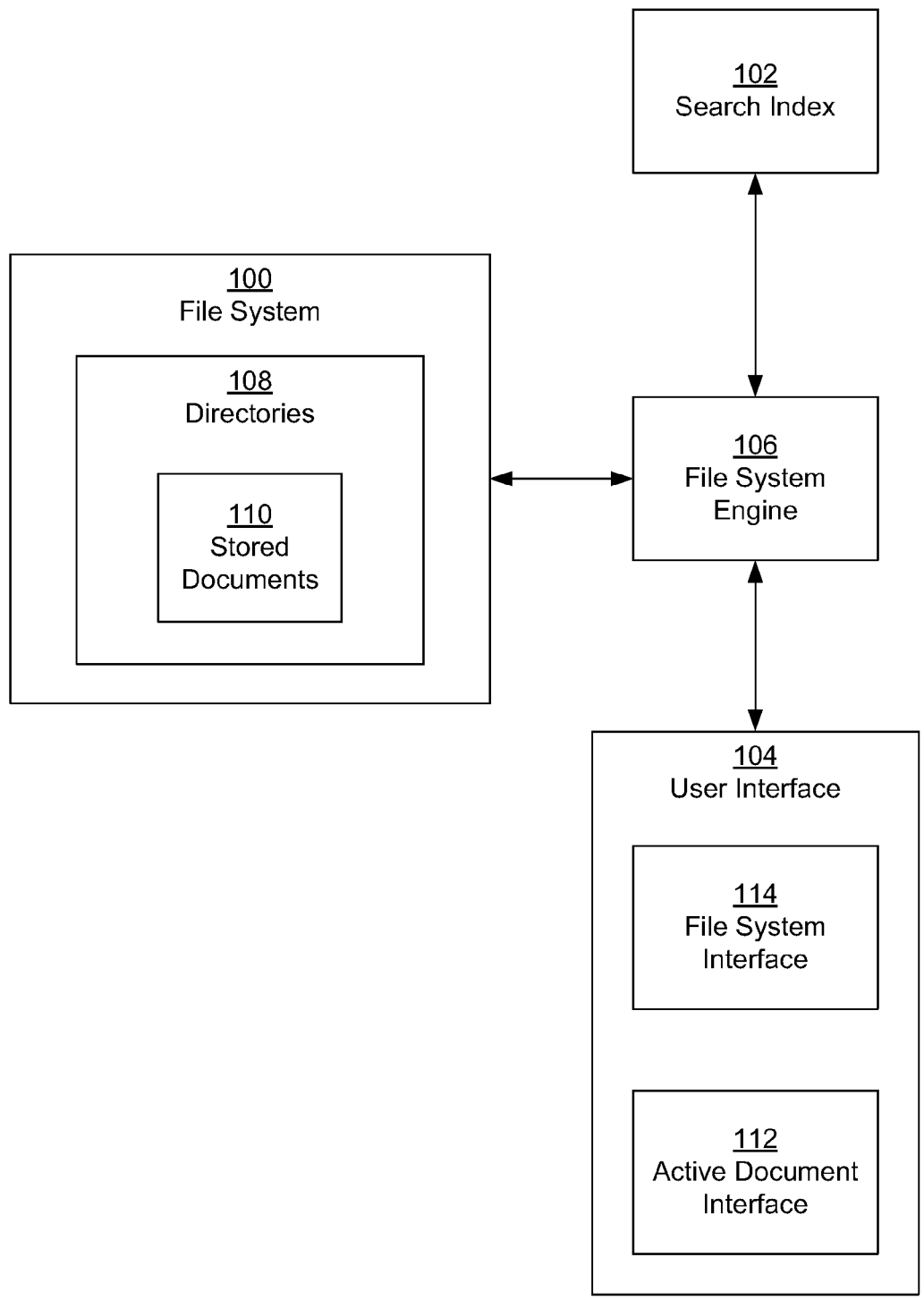
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for accessing a file system. Specifically, embodiments of the invention perform a similarity analysis to identify directories which have documents that are similar to a document specified by the user. More specifically, embodiments of the invention compare the terms in the document with a search index of the documents on the user's computer. Thus, a user may open a similar document, open a directory having similar documents, or save the document to a directory having similar documents.

FIG. 1 shows a schematic diagram of a system in accordance with one or more embodiments of the invention. As shown in FIG. 1, the system includes a file system (100), a search index (102), a user interface (104), and a file system engine (106). Each of these components is described below.

A file system (100) corresponds to a storage mechanism for storing files in accordance with one or more embodiments of the invention. A file system (100) includes directories (108) in accordance with one or more embodiments of the invention.

A directory (108) corresponds to a partition of the file system that is used for organizational purposes. For example, a directory may be used to store a category of documents (e.g., a directory for a user, directory for a project, a directory for an application, etc.). A document corresponds to a file from which text may be extracted. For example, a document may correspond to a presentation, email, hypertext markup language document, word processing document, spreadsheet document, text document, MPEG Audio Layer 3 (MP3) etc. In alternative embodiments of the invention, a document may be any type of file. For example, a document may be an audio or video file from which similarity with stored documents may be identified.

Directories are often arranged in a hierarchy in which each directory includes one or more sub-directories. However, other arrangements of directories may also be used. Further, directories (108) include stored documents (110) or other classes of files (not shown) or both. Stored documents (110) correspond to a collection of files maintained in the file system (100).

In one or more embodiments of the invention, information about the stored documents (110) is maintained in a search index (102). A search index (102) corresponds to a listing of the terms found in the indexed documents. An entry in the listing may correspond to a single word or a phrase. Further, entries may overlap in terms. Additionally, common terms, such as "a," "the," "an," "that," and other such terms, may or may not have an associated entry in the search index (102).

For example, consider the scenario in which a document has the phrase "The quick brown fox jumped over the lazy dog." Words, such as "the", "quick", "brown", "fox", "jumped", "over", "lazy", and "dog", may be included in the search index. Alternatively, "the" may not exist in the search index according to the requirements of the search and how similarity is computed. Further, phrases, such as "brown fox" and "lazy dog", may be included in the search index. Additionally, overlapping phrases, such as "the quick", "quick brown", "brown fox", "fox jumped", "jumped over", "over the", "the lazy", and "lazy dog", may all be included in the search index.

Each entry in the search index (102) may be associated with a posting in accordance with one or more embodiments of the invention. A posting records the document in which the term occurs and the number of times that the term occurs in the document. The document may be stored on the posting using, for example, the document identifier of the document. Additionally, the posting may include an indication of the position in the document at which the term occurred.

In one or more embodiments of the invention, the entries in the search index are stored in a data structure for fast retrieval. For example, the entries in the search index may be stored in a dictionary that may be accessed via a hashing algorithm or binary search. Each entry in the search index may include a reference to the postings associated with the entry and an indication of the number of documents in which the entry may be identified. Alternatively, other techniques may also be used.

Continuing with FIG. 1, in addition to the search index (102) and file system (100), the system also includes a user interface (104). In one or more embodiments of the invention, a user interface (104) corresponds to a mechanism by which a user may interact with a computer (not shown). The user interface (104) may correspond to a graphical user interface, command line based interface, or any other type of interface. The user interface (104) may include an active document interface (112) and a file system interface (114).

In one or more embodiments of the invention, an active document interface (112) corresponds to a mechanism for a user to interact with an active document. An active document corresponds to any type of document which is in use by the user. Specifically, an active document may correspond to a document that is opened, viewed, selected (e.g., highlighted or otherwise indicated) using the user interface (104), or is activated by transference from a network, executed, etc. Further, the active document may or may not correspond to one of the stored documents (110). For example, the active document interface may correspond to an application that has the active document opened or may retrieve the active document, such as a word processing application, music player, etc.

In one or more embodiments of the invention, the active document interface (112) includes functionality to access the file system interface (114). A file system interface (114) corresponds to a mechanism by which a user interacts with the file system (100) by opening and saving active documents. Moreover, a file system interface (114) includes functionality to display a list of similar documents or a list of directories that include similar documents in accordance with one or more embodiments of the invention.

In one or more embodiments of the invention, a similar document corresponds to a stored document having one or more terms or phrases that are the same or similar derivative to the terms and phrases in the active document. In one or more embodiments of the invention, terms in the active document are given weights. In particular, specialized terms, such as industry specific terms, are given a greater weight then terms that generally appear in a variety of documents. Further, the list of similar documents may be ordered by similarity. Specifically, the order of the similar documents in the list may be based on the result of a function that combines the weights of the terms and phrases that exists in both documents (i.e., the active document and the similar document) and the weights of all terms in both documents.

The file system interface (114) also includes functionality to display a list of directories that include similar documents. In one or more embodiments of the invention, the list of directories is ordered according to the number of similar documents. Further the list of directories may be ordered according to the percentage of similar documents in the directory. Alternatively, the directory may be ordered according to the number of terms in each directory that are the same as the active document.

In one or more embodiments of the invention, interposed between the file system (100), search index (102), and graphical user interface (104) is a file system engine (106). A file system engine (106) includes functionality to access the file system in order to retrieve stored document, store documents (i.e., active document, stored documents, etc.), and obtain information about stored documents. Moreover, a file system engine (106) includes functionality to generate the search index (102) and identify similar documents in the file system in order to populate the file system interface (114).

Figure 2:
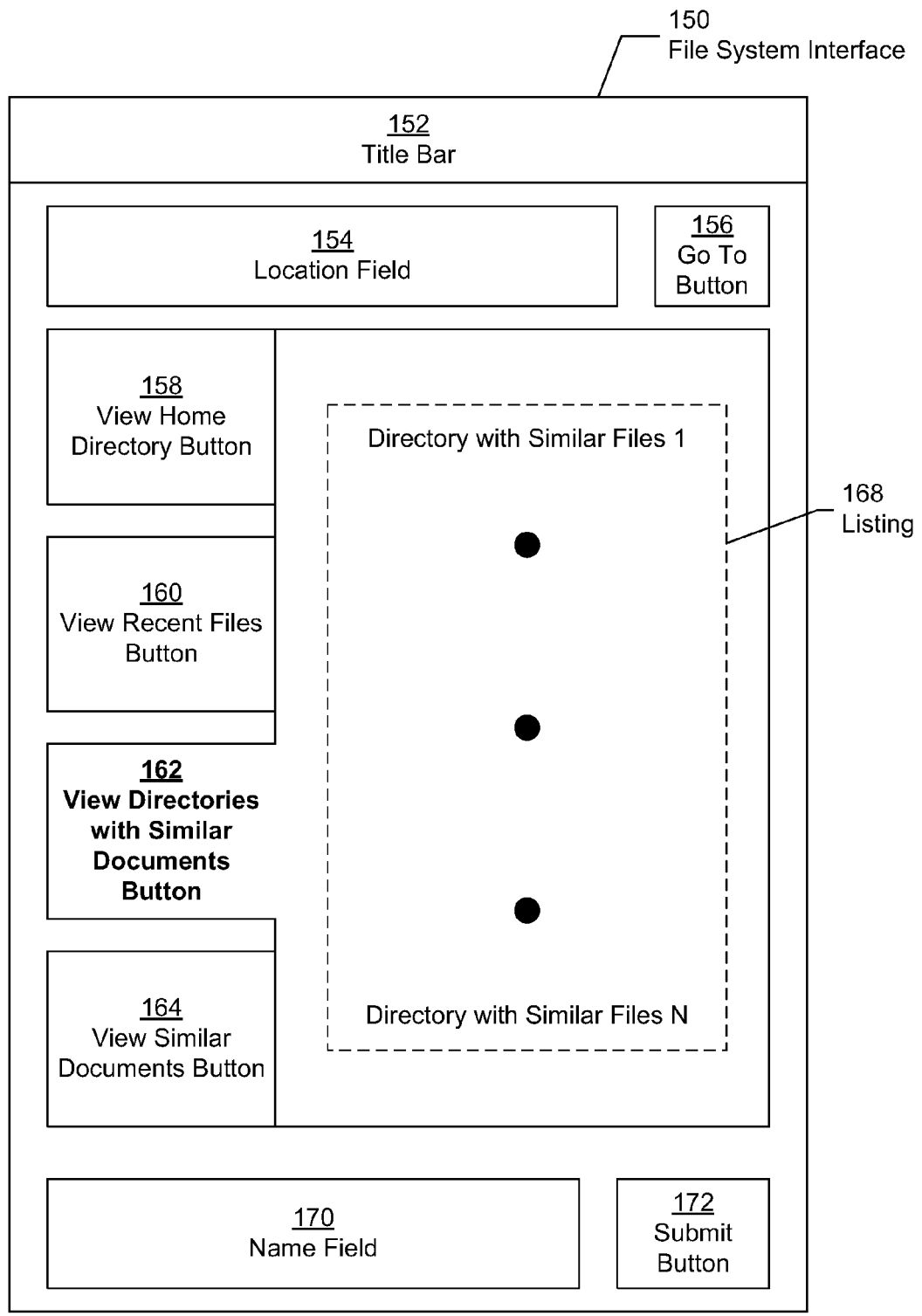
FIG. 2 shows an example file system interface in accordance with one or more embodiments of the invention.

FIG. 2 shows an example file system interface (150) in accordance with one or more embodiments of the invention. Specifically, FIG. 2 shows an example interface for a user to save or open an active document in accordance with one or more embodiments of the invention. FIG. 2 is intended solely for exemplary purposes. The actual display to the user may vary based on the operating system, file system engine, and whether a graphical user interface is used.

As shown in FIG. 2, the file system interface (150) may include a title bar (152), listing (168), location field (154), go to button (156), name field (170), and submit button (172). The title bar (152) may be used, for example, to indicate to the user whether the user is opening or saving a file. The listing (168) shows a list of directories and files. The location field (154) may show the location of the listing (168) in the file system.

Further, the location field (154) may be configured to receive input from the user. The go to button (156) may be associated with the location field such that upon input in the location field (154) and the go to button (156), the listing (168) shows a list of directories or files at the location specified in the location field (154).

In addition to the location field (154) and go to button (156), the file system interface (150) may also include a name field (170) and submit button (172). The name field (170) may be used for a user to input a name of a directory or file listed in the listing (168). Once the user has entered the name, the submit button (172) may be used to open a directory or finalize the storage or retrieval of the file.

The exemplary file system interface (150) may also include shortcut buttons (e.g., view home directory button (158), view recent files button (160), view directories with similar documents button (162), view similar documents button (164)). By selecting any of the shortcut buttons, the user may view a listing (168) associated with the button. For example, a user may select on the view home directory button (158) to immediately view a listing of directories and files in the home directory (e.g., a specific directory for the user application). In another example, the view recent files button (160) allows a user to view a listing of the files which the user has recently opened or otherwise activated.

When the view directories with similar documents button (162) is selected, as shown in the example, a listing of directories having similar documents within the directory may be displayed. The listing of directories may show the directories with the highest aggregate similarity with the active document. For example, the average or total similarity for all of the documents in a directory may be computed to identify a directories similarity score. Directories with a similarity score above a predefined threshold may be displayed. Further, the number of directories may be limited to a specified number. For example, only the directories with the ten greatest similarity score may be shown. Further, both a directory and the sub-directories of the directory may be shown in the listing (168) in accordance with one or more embodiments of the invention.

As an alternative to displaying a listing of directories with similar documents, a listing of similar documents may be displayed. Specifically, when the view similar documents button (164) is selected, the listing corresponds to a listing of similar documents. The documents in the listing are ordered according to the similarity in accordance with one or more embodiments of the invention. In one or more embodiments of the invention, the view similar documents button is not displayed or able to be selected when accessing the file system corresponds to saving a file.

Other arrangements of buttons and fields in the file system interface, not shown in FIG. 2, may be used. For example, if a command line interface is used, then the user may type in a command to view a list of directories with similar documents. In another example, if an auditory interface is used, then the user may speak a command to view or listen to a list of directories with similar documents.

Figure 3A:
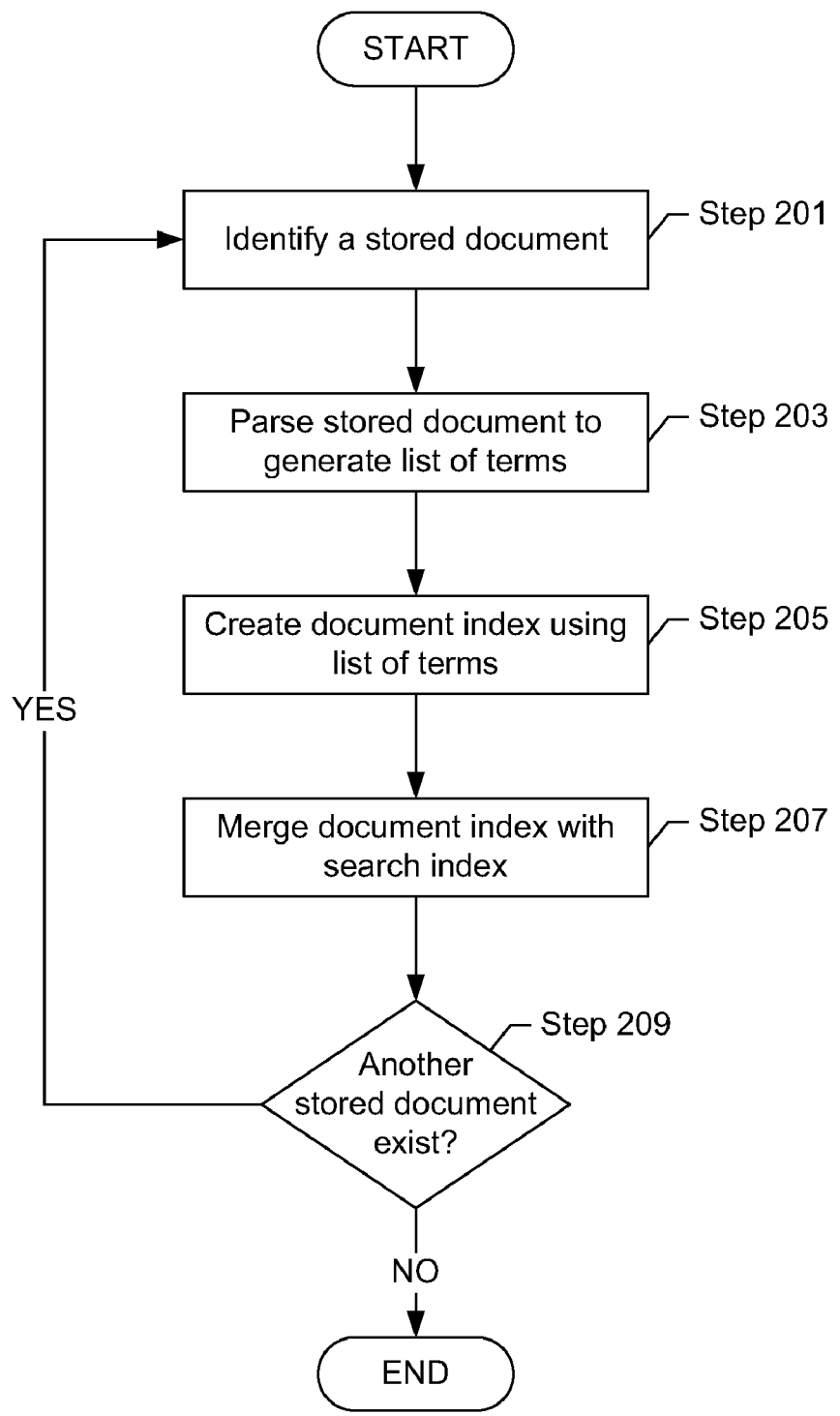
FIGS. 3A-4B show flowcharts of methods in accordance with one or more embodiments of the invention.

FIGS. 3A-4B show flowcharts of methods in accordance with one or more embodiments of the invention. While the various steps in these flowcharts are presented and described sequentially, one of ordinary skill will appreciate that some or all of the steps may be executed in different orders and some or all of the steps may be executed in parallel. FIG. 3A shows a flowchart of a method to create a search index in accordance with one or more embodiments of the invention. Initially, a stored document is identified (Step 201). The stored document corresponds to one of the documents from which the search index is to be created.

Using the file type of the file to identify the terms from the formatting, a stored document may be parsed to generate a list of terms (Step 203). Next, terms that correspond to phrases may be grouped. Determining how to group the terms may be performed according to characteristics of the term (e.g., proper nouns), a stored dictionary, and formatting. For example, "Abraham" and "Lincoln" may be grouped when "Abraham" directly precedes "Lincoln."

The list of terms, including grouped phrases may be used to create a document index (Step 205). Specifically, terms and phrases from the list of terms may be added to the document index. When parsing the stored document or adding terms to the document index, common terms (e.g., a, and, an, the, that, etc.) may be ignored. Further, the document index may be reduced by maintaining the number of instances of the term in the list of terms rather than maintaining each instance of a term individually. For example, if the document index already has an entry of "Beagle" when "Beagle" is identified a second time in the list of terms, then a number associated with "Beagle" may be incremented to two in order to include the second instance. Further, the position in which "Beagle" appears in the stored document may be maintained with "Beagle" in the document index.

Next, the document index may be merged with the search index (Step 207). Specifically, for the first stored document that is added, the search index may be created and the document index added to the newly created search index. Adding the document index to the search index may be performed by comparing the document index with entries already in the search index. Any entry in the search index that corresponds to terms in the stored document may be amended by adding a posting for the entry from the stored document. Specifically, the posting may identify the stored document, the number of instances of the term or phrase in the stored document, and the position of the term or phrase in the stored document. Further, the search index may be amended to include entries in the document index that do not previously exist in the search index.

A determination may then be made whether another stored document exists (Step 209). Specifically, at any time during the creation and use of the search index, the search index may be amended to include more stored documents. For example, when a new document is stored in the file system, entries in the search index corresponding to terms in the new document may be amended or added accordingly. Further, the index may be amended to remove and amend postings for stored documents that are deleted or moved in the file system. If another stored document is found, then the next stored document is identified (Step 201) and the process may repeat with adding terms for the next stored document.

Figure 3B:
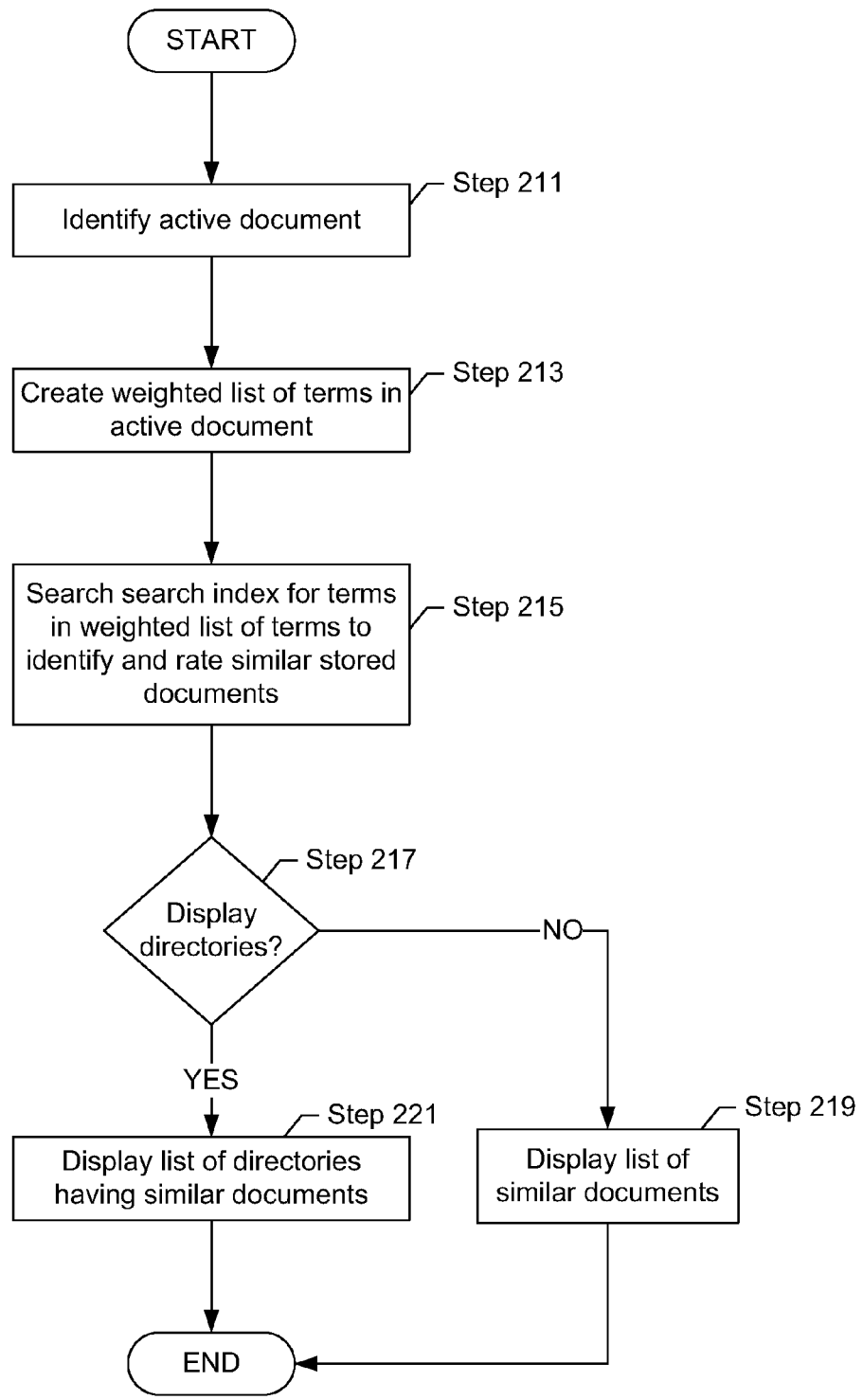

FIG. 3B shows a flowchart of a method for accessing the file system using the search index in accordance with one or more embodiments of the invention. Initially, an active document is identified (Step 211). An active document may be identified as an opened document. An interface for the active document, such as a music player or recorder, may request the file system interface to access the file system.

Once the active document is identified, a weighted list of terms in the active document is created (Step 213). Creating the weighted list of terms in the active document may be performed in a manner similar to creating document index for one of the stored documents as described above. Weights may be added to the terms in the list of terms according to a weighting function. For example, one type of weighting function is TFxIDF. In TFxIDF, a weight assigned to a term is computed by multiplying the frequency of the term in the document by the inverse document frequency (i.e., 1 over the number of documents in which the term occurs.) Thus, in TFxIDF, terms are given higher weights when the terms occur frequently in the document and infrequently in the remaining documents. Further, terms may be given greater weight when the term appears in the title.

Once the weighted list of terms is created, the search index is searched for terms in the weighted list of terms to identify and rate similar stored documents (Step 215). Specifically, a lookup is performed on the search index for each term in the weighted list of terms in accordance with one or more embodiments of the invention. One way to determine the similarity between a stored document and the active document is to multiply the weight of the term in the stored document with the weight of the term in the active document for each term in both documents to obtain a product. Next, the products may be totaled to identify a similarity score for the stored document with the active document.

Once the similar stored documents are identified and rated, then a determination is made whether to generate a listing of the directories having similar documents (Step 217). If the directories having similar documents are not generated, then a list of similar documents may be generated. Specifically, in one or more embodiments of the invention, a list of similar documents is generated based on rating the similar documents and displayed (Step 219). Alternatively, if the directories with similar documents are generated, then the directories with similar documents may be ordered as discussed above and the list of directories is displayed according to the order in the file system interface (Step 221).

Regardless of whether the list of directories is displayed or a list of similar documents is displayed, the file system is accessed. Specifically, the user may select a directory or a similar document and request to open a similar document, a file, or a directory. Further, rather than displaying the list of directories or the list of similar documents, the lists may be output as audio. Specifically, using a text to speech conversion program, each directory may be translated to an audio file. The audio file may then be played for the user.

Figure 4A:
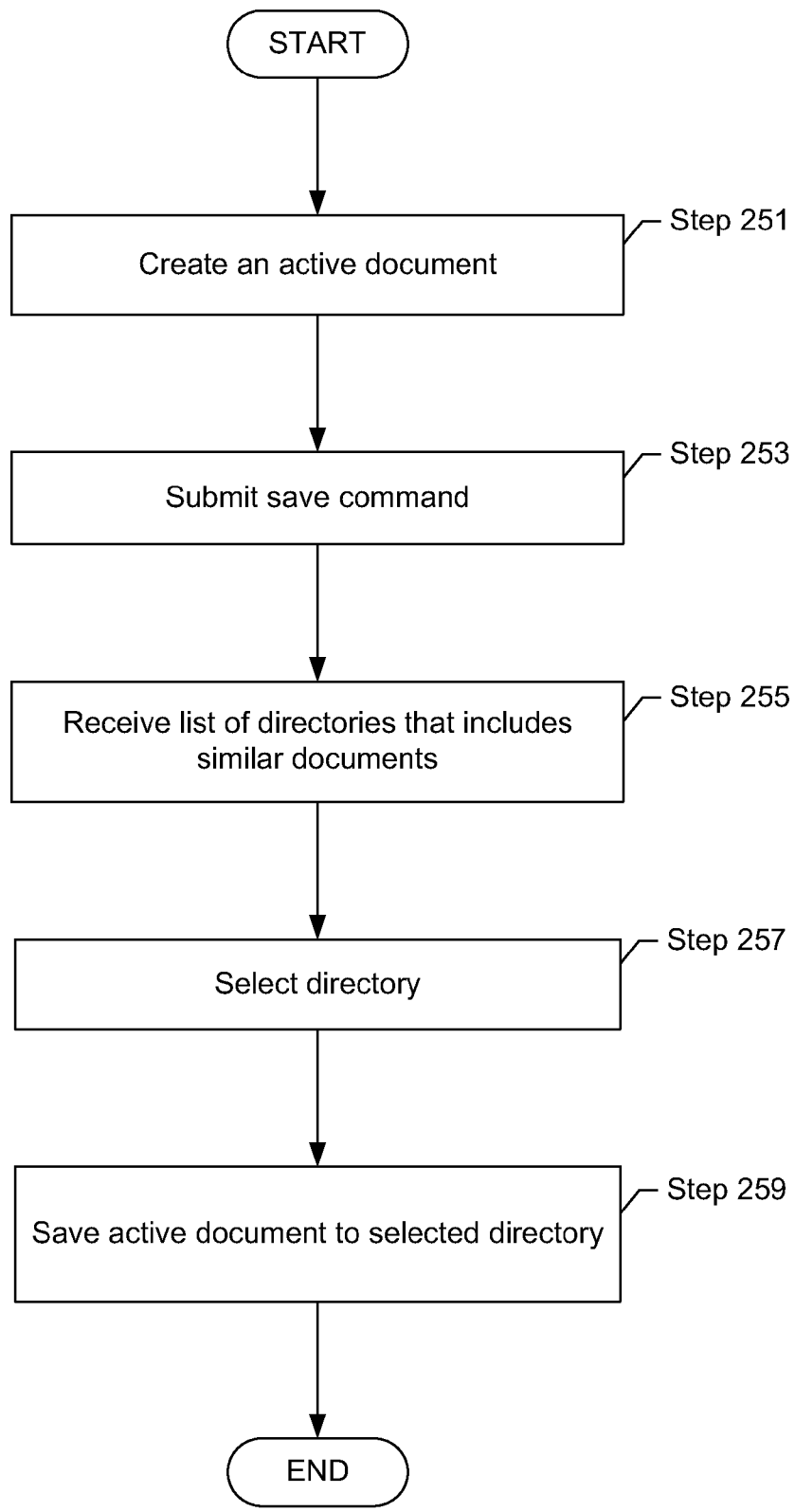
Figure 4B:
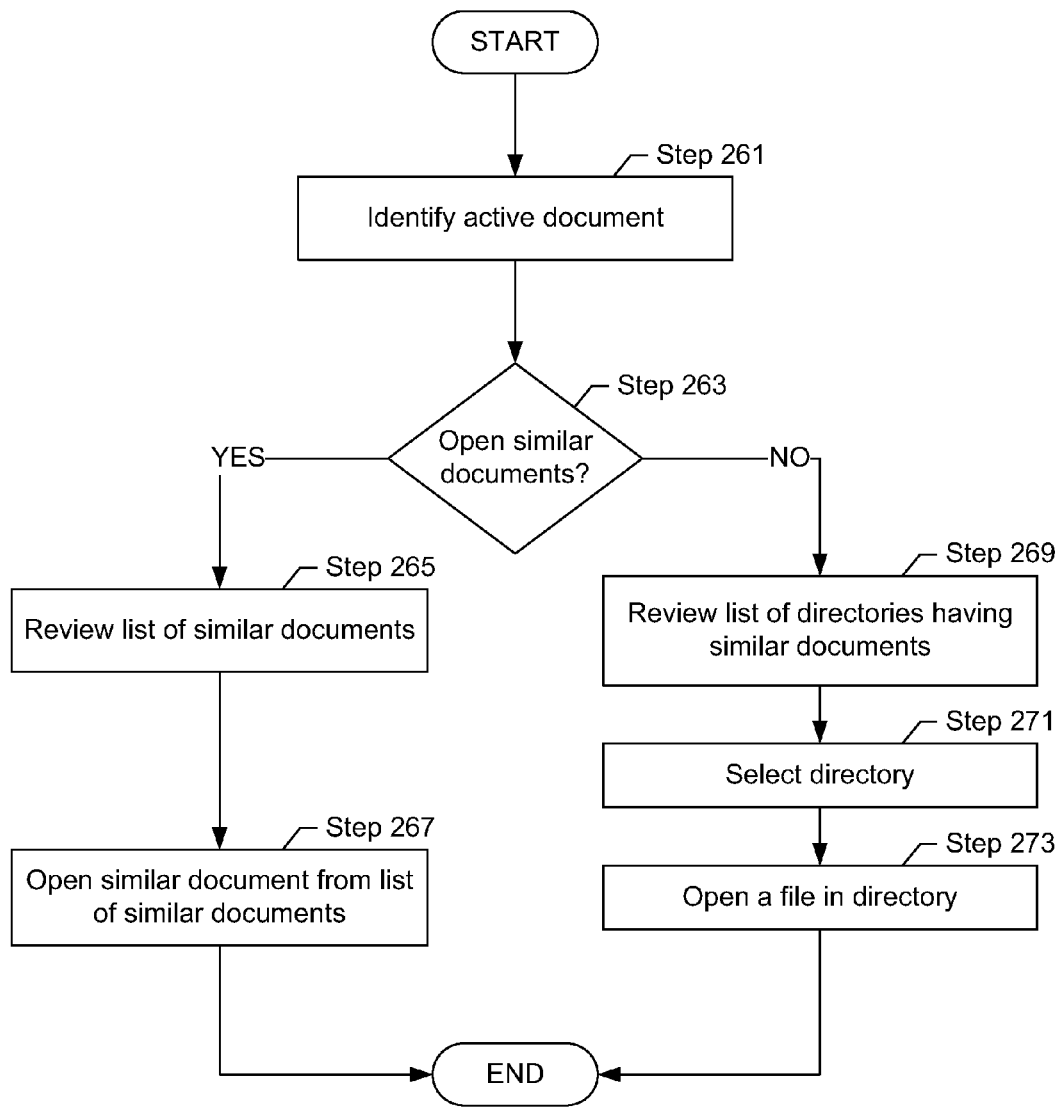

FIGS. 4A-4B show flowcharts of a method for a user to access a file system in accordance with one or more embodiments of the invention. Specifically, FIG. 4A shows a flowchart of a method for a user to save an active document. Initially, a user creates an active document (Step 251). The user may create an active document by opening a stored document, creating a new document, requesting a document be retrieved from a network, etc.

Next, the user submits a save command (Step 253). When the user submits the save command, the user may be navigated to a file system interface. In the file system interface, the user may select, for example, to save the active document to a directory that has similar documents. Alternatively, the user may be directed, by default, to a listing of directories with similar documents.

Accordingly, the list of directories having similar documents is generated. Accordingly, the user receives and reviews the list of directories that include similar documents (Step 255). Directories listed in the list of directories that includes similar documents may be distributed throughout the file system. Thus, by reviewing a list of directories that may or may not be sub-directories of the same directory, embodiments of the invention may allow the user to review a virtual organization of the file system.

After reviewing the list of directories with similar documents, the user may select a directory from the list of directories (Step 257). Specifically, the user may open one of the directories in the list of directories. Next, the user may save the active document to the selected directory (Step 259).

In addition to saving a document, a user may also open a document using the file system interface. FIG. 4B shows a flowchart of a method for a user to save a similar document in accordance with one or more embodiments of the invention. Initially, an active document is identified (Step 261). The active document may be identified as a document that the user has opened or has available. For example, the user may specify, when accessing the file system interface, that the user wants a document that is similar to another document that is specified by the user. Accordingly, the file system interface is displayed for the user in accordance with one or more embodiments of the invention.

Next, the user determines whether to open the document from a list of similar documents (Step 263). For example, the user may desire to open a similar document rather than a file (e.g., document or otherwise) from a directory having similar documents. If the user requests to open a similar document, than the file system engine may create a list of similar documents. Thus, using the file system interface, the user may review the list of similar documents in accordance with one or more embodiments of the invention (Step 265). Similar documents in the list of similar documents may be distributed throughout the file system. Thus, the user may select one or more similar documents to open from the list of similar documents (Step 267). For example, the user may highlight one or more similar documents and request that the highlighted documents be opened.

Rather than opening similar documents, the user may submit a command to open a file from a directory having similar documents. If the user requests to open a file from a directory having similar documents, then a list of directories is displayed. Accordingly, the user may review the list of directories having similar documents (Step 269). Next, a directory from the list of directories is selected (Step 271). Specifically, the user may request to view the contents of the directory. When the directory is opened, a list of documents, non-textual based files, and sub-directories contained in the directory may be shown. Accordingly, the user may open a file in the directory (Step 273). Opening the file in the directory may correspond to a user selecting a sub-directory and opening a file in the sub-directory. Further, the file that the user opens may correspond to a stored document, a similar document, or a file from which text may not be extracted.

Figure 5:
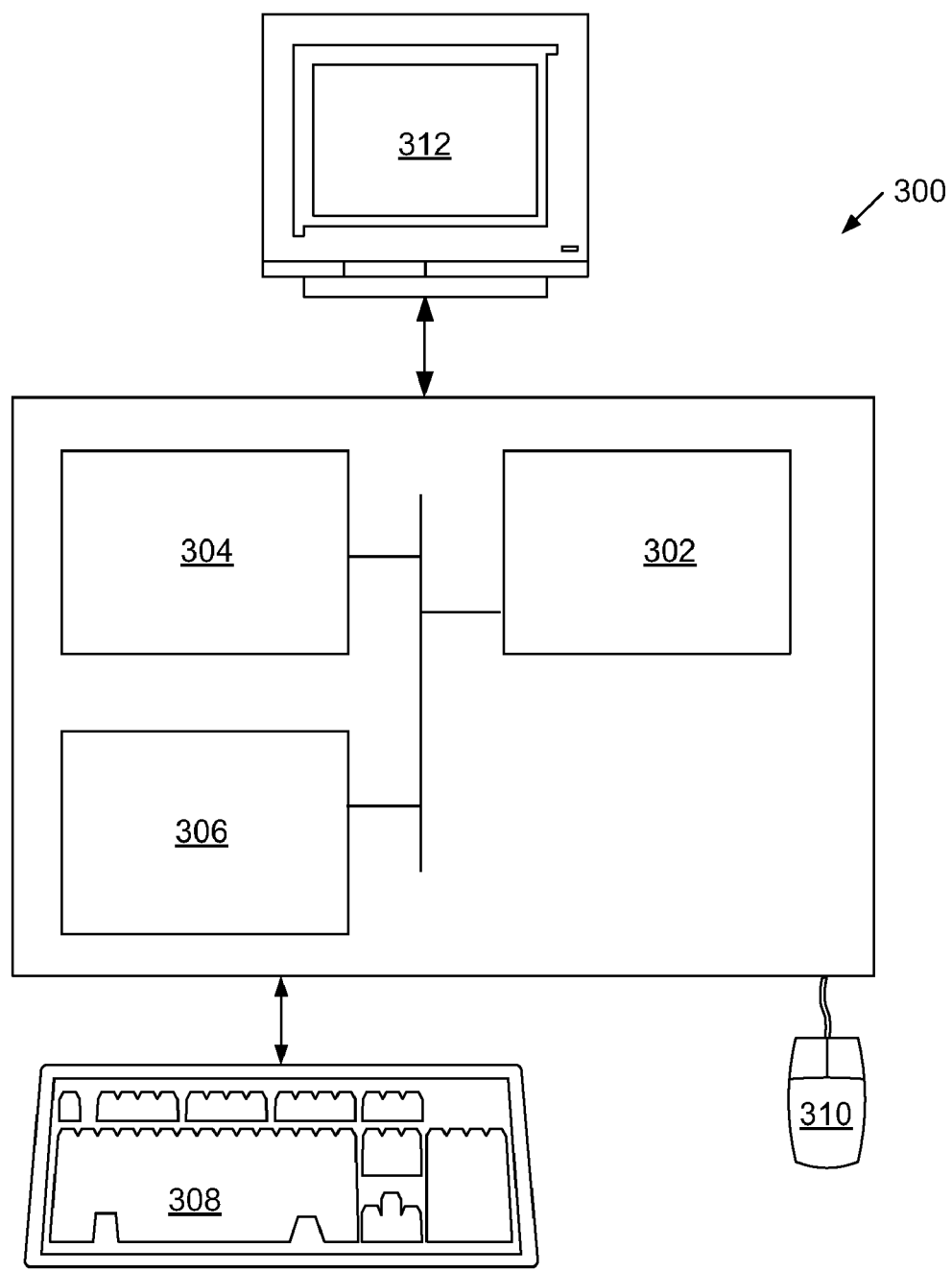
FIG. 5 shows a computer system in accordance with one or more embodiments of the invention.

The invention may be implemented on virtually any type of computer regardless of the platform being used. For example, as shown in FIG. 5, a computer system (300) includes a processor (302), associated memory (304), a storage device (306), and numerous other elements and functionalities typical of today's computers (not shown). The computer (300) may also include input means, such as a keyboard (308) and a mouse (310), and output means, such as a monitor (312). The computer system (300) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (300) may be located at a remote location and connected to the other elements over a network. Further, the invention may be implemented on a distributed system having a plurality of nodes, where each portion of the invention (e.g., directories in directory structure, file system engine, file system, active document, index) may be located on a different node within the distributed system. In one embodiment of the invention, the node corresponds to a computer system. Alternatively, the node may correspond to a processor with associated physical memory. The node may alternatively correspond to a processor with shared memory and resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computerized method for accessing a file system comprising:
   displaying, on a computer display, an active document interface comprising an active document that is in use by a user;
   receiving a selection from the user to display a file system interface that allows interaction with the file system by the user;
   displaying, on the computer display, the file system interface comprising a view similar documents button;
   receiving a selection of the view similar documents button by the user;
   identifying a plurality of active terms comprising words found in the active document;
   determining a plurality of active frequencies of occurrence of the plurality of active terms;
   assigning a plurality of active weights to the plurality of active terms based on the plurality of active frequencies of occurrence to generate a plurality of weighted active terms;
   identifying a plurality of weighted indexed terms comprising words found in a plurality of stored documents that are stored in the file system, wherein the plurality of weighted indexed terms are weighted according to a plurality of stored frequencies of occurrence in the plurality of stored documents;
   computing a first numerical similarity score for a first stored document and a second numerical similarity score for a second stored document by comparing the plurality of weighted active terms with the plurality of weighted indexed terms;
   determining a document order of the first stored document followed by the second stored document based on the first numerical similarity score exceeding the second numerical similarity score;
   generating a list of similar documents comprising the first stored document followed by the second stored document based on the document order; and
   displaying, in the file system interface and on the computer display, the list of similar documents while the active document is open in the active document interface.

2. The method of claim 1, further comprising:
   identifying, for the first stored document of the plurality of stored documents, a plurality of first common terms that are in both the plurality of weighted active terms and a plurality of first weighted indexed terms of the first stored document;
   multiplying, for each common term in the plurality of first common terms, a first active weight of the common term in the plurality of weighted active terms by a first stored weight of the common term in the plurality of first weighted indexed terms of the first stored document to generate a plurality of first products;
   summing the plurality of first products to generate the first numerical similarity score for the active document and the first stored document;

identifying, for the second stored document of the plurality of stored documents, a plurality of second common terms that are in both the plurality of weighted active terms and a plurality of second weighted indexed terms of the second stored document;

multiplying, for each common term in the plurality of second common terms, a second active weight of the common term in the plurality of weighted active terms by a second stored weight of the common term in the plurality of second weighted indexed terms of the second stored document to generate a plurality of second products; and summing the plurality of second products to generate the second numerical similarity score for the active document and the second stored document, wherein the first numerical similarity score exceeds the second numerical similarity score.

3. The method of claim 1, further comprising:
identifying a plurality of stored terms comprising words found in the plurality of stored documents;
determining the plurality of stored frequencies of occurrence of the plurality of stored terms; and
assigning a plurality of stored weights to the plurality of stored terms based on the plurality of stored frequencies of occurrence to generate the plurality of weighted indexed terms.

4. The method of claim 1, further comprising:
identifying the first stored document in a first directory; and
identifying the second stored document in a second directory that is distinct from the first directory.

5. The method of claim 4, further comprising:
receiving the first directory as input to a name field in the file system interface;
receiving a selection of a submit button in the file system interface; and storing the active document in the first directory.

6. The method of claim 4, further comprising:
determining a directory order of the first directory followed by the second directory based on the first numerical similarity score exceeding the second numerical similarity score;
generating a list of directories including similar documents comprising the first directory followed by the second directory based on the directory order; and
displaying, in the file system interface and on the computer display, the list of directories including similar documents while the active document is open in the active document interface.

7. The method of claim 6, further comprising:
opening the first directory in the list of directories including similar documents using the file system interface; and
opening the first stored document in the first directory.

8. A system for accessing a file system comprising:
a memory coupled to a processor;
an active document interface configured to display an active document that is in use by a user;
a document index, stored in the memory and configured to:
store a plurality of active terms comprising words found in the active document;
a search index stored in the memory and configured to:
store a plurality of weighted indexed terms comprising words found in a plurality of stored documents that are stored in the file system, wherein the plurality of weighted indexed terms are weighted according to a plurality of stored frequencies of occurrence in the plurality of stored documents;

a file system engine, executing on the processor and configured to:
determine a plurality of active frequencies of occurrence of the plurality of active terms;
assign a plurality of active weights to the plurality of active terms based on the plurality of active frequencies of occurrence to generate a plurality of weighted active terms;
compute a first numerical similarity score for a first stored document and a second numerical similarity score for a second stored document by comparing the plurality of weighted active terms with the plurality of weighted indexed terms;
determine a document order of the first stored document followed by the second stored document based on the first numerical similarity score exceeding the second numerical similarity score; and
generate the list of similar documents comprising the first stored document followed by the second stored document based on the document order; and a file system interface, executing on the processor and configured to:
display a view similar documents button;
receive a selection of the view similar documents button by the user, and
display the list of similar documents while the active document is open in the active document interface, wherein the active document interface is further configured to receive a selection from the user to display the file system interface that allows interaction with the file system by the user.

9. The system of claim 8, wherein the file system engine is further configured to:
identify, for the first stored document of the plurality of stored documents, a plurality of first common terms that are in both the plurality of weighted active terms and a plurality of first weighted indexed terms of the first stored document;
multiply, for each common term in the plurality of first common terms, a first active weight of the common term in the plurality of weighted active terms by a first stored weight of the common term in the plurality of first weighted indexed terms of the first stored document to generate a plurality of first products;
sum the plurality of first products to generate the first numerical similarity score for the active document and the first stored document;
identify, for the second stored document of the plurality of stored documents, a plurality of second common terms that are in both the plurality of weighted active terms and a plurality of second weighted indexed terms of the second stored document;
multiply, for each common term in the plurality of second common terms, a second active weight of the common term in the plurality of weighted active terms by a second stored weight of the common term in the plurality of second weighted indexed terms of the second stored document to generate a plurality of second products; and
sum the plurality of second products to generate the second numerical similarity score for the active document and the second stored document, wherein the first numerical similarity score exceeds the second numerical similarity score.

10. The system of claim 8, wherein the file system engine is further configured to:

identify the first stored document in a first directory; and identify the second stored document in a second directory that is distinct from the first directory.

11. The system of claim 10, wherein the file system engine is further configured to:

determine a directory order of the first directory followed by the second directory based on the first numerical similarity score exceeding the second numerical similarity score; and generate a list of directories including similar documents comprising the first directory followed by the second directory based on the directory order; and wherein the file system interface is further configured to:

display the list of directories including similar documents while the active document is open in the active document interface.

12. The system of claim 10, wherein the file system interface is further configured to:

receive the first directory as input to a name field in the file system interface;

receive a selection of a submit button in the file system interface; and store the active document in the first directory.

13. A non-transitory computer readable medium storing instruction for accessing a file system, the instructions executable on a processor and comprising functionality for:

displaying, on a computer display, an active document interface comprising an active document that is in use by a user;

receiving a selection from the user to display a file system interface that allows interaction with the file system by the user;

displaying, on the computer display, the file system interface comprising a view similar documents button;

receiving a selection of the view similar documents button by the user;

identifying a plurality of active terms comprising words found in the active document;

determining a plurality of active frequencies of occurrence of the plurality of active terms;

assigning a plurality of active weights to the plurality of active terms based on the plurality of active frequencies of occurrence to generate a plurality of weighted active terms;

identifying a plurality of weighted indexed terms comprising words found in a plurality of stored documents that are stored in the file system, wherein the plurality of weighted indexed terms are weighted according to a plurality of stored frequencies of occurrence in the plurality of stored documents;

computing a first numerical similarity score for a first stored document and a second numerical similarity score for a second stored document by comparing the plurality of weighted active terms with the plurality of weighted indexed terms;

determining a document order of the first stored document followed by the second stored document based on the first numerical similarity score exceeding the second numerical similarity score;

generating a list of similar documents comprising the first stored document followed by the second stored document based on the document order; and displaying, in the file system interface and on the computer display, the list of similar documents while the active document is open in the active document interface.

14. The non-transitory computer readable medium of claim 13, the instructions comprising further functionality for:

identifying, for the first stored document of the plurality of stored documents, a plurality of first common terms that are in both the plurality of weighted active terms and a plurality of first weighted indexed terms of the first stored document;

multiplying, for each common term in the plurality of first common terms, a first active weight of the common term in the plurality of weighted active terms by a first stored weight of the common term in the plurality of first weighted indexed terms of the first stored document to generate a plurality of first products;

summing the plurality of first products to generate the first numerical similarity score for the active document and the first stored document;

identifying, for the second stored document of the plurality of stored documents, a plurality of second common terms that are in both the plurality of weighted active terms and a plurality of second weighted indexed terms of the second stored document;

multiplying, for each common term in the plurality of second common terms, a second active weight of the common term in the plurality of weighted active terms by a second stored weight of the common term in the plurality of second weighted indexed terms of the second stored document to generate a plurality of second products; and summing the plurality of second products to generate the second numerical similarity score for the active document and the second stored document, wherein the first numerical similarity score exceeds the second numerical similarity score.

15. The non-transitory computer readable medium of claim 13, the instructions comprising further functionality for:

identifying the first stored document in a first directory; and identifying the second stored document in a second directory that is distinct from the first directory.

16. The non-transitory computer readable medium of claim 15, the instructions comprising further functionality for:

receiving the first directory as input to a name field in the file system interface;

receiving a selection of a submit button in the file system interface; and storing the active document in the first directory.

17. The non-transitory computer readable medium of claim 16, the instructions comprising further functionality for:

determining a directory order of the first directory followed by the second directory based on the first numerical similarity score exceeding the second numerical similarity score;

generating a list of directories including similar documents comprising the first directory followed by the second directory based on the directory order; and displaying, in the file system interface and on the computer display, the list of directories including similar documents while the active document is open in the active document interface.

* * * * *